(No Model.)
G. CRAIG.
CHEMICAL APPARATUS.
No. 578,003. Patented Mar. 2, 1897.
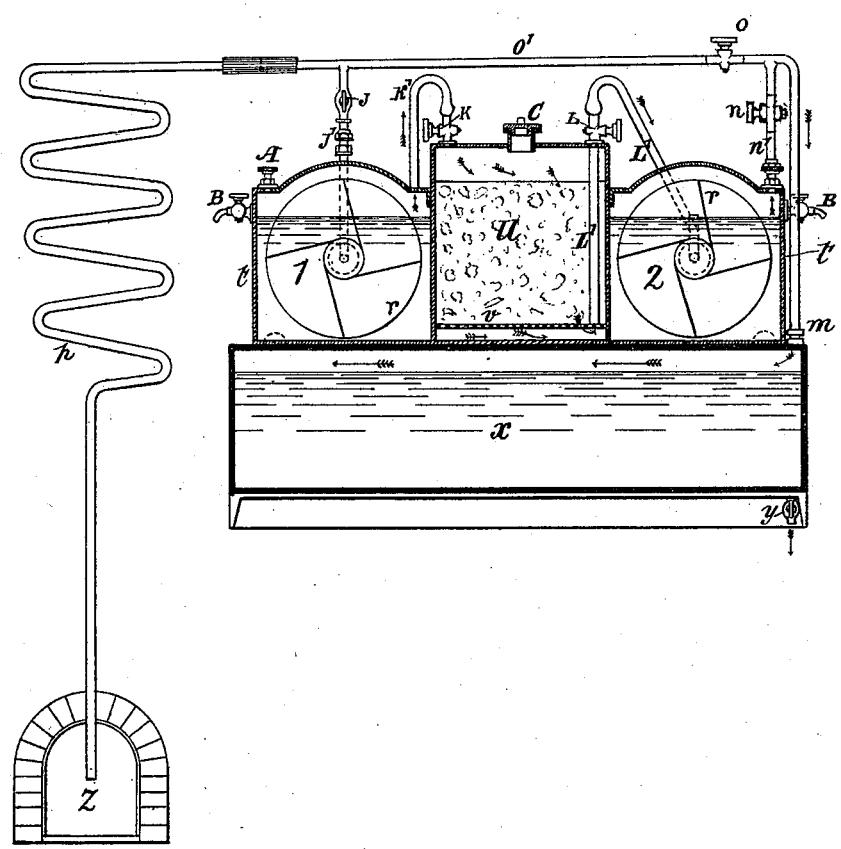
Witnesses
John Hall.
John Thomson.
Inventor.
George Craig
By D. F. Mason
Attorney.

UNITED STATES PATENT OFFICE.

GEORGE CRAIG, OF GLASGOW, SCOTLAND.

CHEMICAL APPARATUS.

SPECIFICATION forming part of Letters Patent No. 578,003, dated March 2, 1897.

Application filed October 15, 1896. Serial No. 609,035. (No model.)

*To all whom it may concern:*

Be it known that I, GEORGE CRAIG, a subject of the Queen of Great Britain, residing at Glasgow, county of Lanark, Scotland, have invented a certain new or Improved Combustion-Testing Apparatus; and I do hereby declare that the following is a full, clear, and exact description of the invention, which will enable others skilled in the art to which it appertains to make and use the same.

The invention relates to a new or improved apparatus for ascertaining the amount of carbonic acid or other constituents in gases or products of combustion from coal or other material by passing a given quantity of the said gases or products through a material which shall absorb the constituent desired to be estimated and measuring the balance of gas or product left, from which may be deduced the state of combustion of gases operated on.

The invention essentially consists in the combination of a gas-measuring device or meter for measuring the original volume, a close vessel containing material which shall absorb carbonic acid or other desired constituent of the gas, and another gas-measuring device or meter for measuring the volume of unabsorbed constituents. I attain these objects by the apparatus illustrated in the accompanying drawing, which is a sectional elevation of an apparatus as constructed in accordance with the invention.

The apparatus comprises a wet gas-meter 1 of ordinary well-known construction, having a case F, an inlet-pipe $J'$, with stop-cock J, and outlet-pipe $K'$, having stop-cock K, leading and connected to the closed vessel $u$, fitted with a perforated plate $v$, near its bottom, leaving a space communicating with its outlet-pipe $L'$, having stop-cock L thereon and leading to and constituting the inlet-pipe to a second wet gas-meter 2, similar to aforesaid meter. The vessel $u$ is provided on top with a charging screw-cap C and near bottom with an opening and stopper (not shown) for withdrawing the absorbing material when spent. Meter 2, having outlet-pipe $n'$ and stop-cock N, communicates with and is connected to main pipe $O'$, having a stop-cock $o$ between it and meter 1. Both said meters are each provided in front with indices (not shown) to conveniently show at least the one-hundredth part of a revolution of the measuring-drum $r$ over and above the usual registering mechanism. For greater convenience the figuring on index-dial of meter 2 may be reversed to show directly the percentage of the absorbed constituent. Each meter has charging-plugs A and gaging-taps B, both meters being charged with paraffin-oil or other suitable liquid having no absorptive action on the gases. By means of the plugs A and taps B the meters are so charged and regulated that when a current of air is drawn through the indices exactly synchronize. The vessel $u$ is filled by the opening C with absorbent material, preferably soda-lime or carbonic acid.

In practice a slight suction is required to induce and maintain a current of gases through the meters and absorbent material, as shown by arrows, and which may be conveniently accomplished for prolonged action by means of the well-known Bunsen water-pump or other water or steam ejector connected to the terminal main pipe at $m$. For short trials or where said pumps or ejectors may be inconvenient the necessary suction may be obtained by an ordinary aspirating-tank $x$, having a charging-inlet plug (not shown) and outlet-tap $y$, as shown.

The apparatus is connected and communicates with the flue Z by means of pipe $p$, sufficiently long to thoroughly cool the gases, the pipes $O'$ and pipe $p$ being connected by any suitable coupling.

The apparatus is operated as follows: By means of the aspirator $x$ or other suction appliance a constant current of the gases from the flue Z is drawn along the main tube $O'$ of the apparatus and by gradually closing stop-cock $o$ as small a current of gas as may be desired is caused to by-pass through the meters 1 and 2, the drums of which may conveniently revolve once in from two to ten minutes. The indices of the meters are carefully read and noted at the commencement and the finish of the trial. These readings give the initial and final volumes of the gas, the difference representing the carbonic acid or other absorbed constituent in the initial volume, from which the percentage of absorbed constituent is easily deduced. By simply reading during the trial the index of meter 2 at each complete revolution of meter 1 drum the percentage of carbonic acid or other constituent absorbed is obtained direct.

Having now described my invention, what I claim, and desire to secure by Letters Patent, is—

1. A gas-analysis apparatus consisting of two gas-meters 1 and 2, an intermediate absorbing vessel $u$, meter inlet-pipes J' and L'; pipes K' and O' and $n'$; stop-cocks J, K, L, O, and $n$; and aspirator $x$ all arranged, combined and operating substantially as hereinbefore set forth and shown.

2. A gas-analysis apparatus comprising two gas-meters, an intermediate vessel containing material which shall absorb the constituent desired to be estimated, and an aspirator or suction-pump, all combined and operating substantially as hereinbefore set forth.

In testimony whereof I hereby affix my signature in presence of two witnesses.

GEORGE CRAIG.

Witnesses:
DAVID F. MASON,
WILLIAM DUNN.